United States Patent [19]

North et al.

[11] Patent Number: 4,734,040

[45] Date of Patent: Mar. 29, 1988

[54] MEMORY ENHANCEMENT DEVICE AND METHOD

[76] Inventors: Larry J. North, 988 E. S. Union Ave. #12, Midvale, Utah 84047; Vaughn W. North, 2486 E. 1037S South, Sandy, Utah 84092

[21] Appl. No.: 23,572

[22] Filed: Mar. 9, 1987

[51] Int. Cl.⁴ .......................................... A47B 41/00
[52] U.S. Cl. ................................................... 434/433
[58] Field of Search ............................. 434/433, 172; 273/137 C

[56] References Cited

U.S. PATENT DOCUMENTS 1,079,504  11/1913  Macaulay ............................ 434/433
4,504,236   3/1985  Zellweger ........................... 434/433

Primary Examiner—Gregory E. McNeill
Attorney, Agent, or Firm—Thorpe, North & Western

[57] ABSTRACT

A device for storing a serial string of confidential numbers or letters in public view without compromising the confidentiality or identity of the numbers or letters, yet enabling a person having knowledge of those numbers to recognize and recall their identity. The device comprises a carrier surface and a matrix of contiguous graphic boxes positioned on the carrier surface and having empty spaces for insertion of numerals or letters therein. Each box has alignment with other boxes along at least two diagonals within the matrix. The confidential string of letters or numbers are inserted within empty boxes along one or more diagonals with in the matrix, with the remaining boxes being filled in with random numbers and letters to disguise the identity and location of the confidential sequence.

8 Claims, 2 Drawing Figures

MEMORY ENHANCEMENT DEVICE AND METHOD

BACKGROUND OF THE INVENTION

1. Field of Invention

This invention relates to methods and devices for enabling an individual to recall numbers in a predetermined sequence. More specifically, the subject invention pertains to methods and devices for assisting persons with memory recall of confidential numbers such as lock combinations, checking account numbers, bank access codes, etc.

2. Prior Art

Frequently, the need arises for recall of a confidential number involving several digits in a predetermined sequence. For example, access to security locations such as safes, buildings, automobiles and the like may be regulated by a lock requiring entry of sequential numbers to operate the release mechanism. Similarly, access to computer data base files, computer and communication link ups and financial accounts with banks and similar institutions require use of a security access code. Typically, these codes are numerals which are stated in a specific sequence.

Recall of such confidential combinations and numbers typically present a significant challenge to many individuals. Where a person is required to maintain several combinations, access codes or other sequential numbers in memory, recall may prove very difficult without some type of memory device.

One of the common circumstances requiring immediate recall of a confidential sequence of numbers arises with the use of automatic cash dispensing systems such as mechanized bank teller devices. Typically, the sequence of use involves entering a credit card number into a scanning device for identification of the account for a deposit or withdrawal, whereupon the device requests manual entry of an account access number. Typically, this number is four numerals such as "5137." Where customers have a choice, such numerals are selected as birthdates, social security numbers or some other easily recalled numeral sequence. More often than not, however, banks arbitrarily assign the access number to the customer. Under these situations, the customer must recall a series of random numbers in order to gain access to the bank account via automatic teller devices.

The customer receives a card bearing the coded access number and is instructed not to carry the card in combination with the credit card. Obviously, an individual finding a lost wallet could utilize the credit card and any accompanying identification access code to make immediate withdrawal of cash funds through an automatic teller. Such risks discourage customers from including any reference to access codes within the wallet. Accordingly, the customer is typically left to his memory to recall the access number at the appropriate time. It is not infrequent that an individual may confuse several numbers or otherwise be unable to enter the access code and will thereby be frustrated in any ability to acquire cash from the automatic teller.

OBJECTS AND SUMMARY OF THE INVENTION

It is therefore an object of the present invention to provide a device and method for assisting an individual in recall of numbers/letters in a given sequence.

It is 1 further object of the present invention to provide such a memory device which conceals the number sequence in a manner which prevents identification of the number to a third party, despite third party access to the memory device.

It is a still further object to provide such a memory device and method which is inexpensive, simple to use and which may be carried in direct combination with a credit card within a person's wallet or purse.

These and other objects are realized in a device which includes a carrier surface having dimensions permitting storage of the device within a purse or wallet. The carrier surface is adapted with a matrix of contiguous graphic boxes printed or otherwise positioned on the carrier surface which have empty spaces for placement of numerals therein. Each box is in common alignment with other boxes along at least two diagonals within the matrix to thereby form at least two rows of boxes respectively in linear array. One or more serial strings of numbers or letters to be stored for later observation and recall is positioned within a sequential linear array of boxes along one of the aligned diagonals of the matrix. Other arrangements of numbers or letters to be recalled may be stored along other diagonals in a variety of orientations. After all combinations of numbers and/or letters have been filled, the remaining empty boxes are filled with random numbers or letters to best disguise the location and identity of the secret numbers.

DETAILED DESCRIPTION OF THE INVENTION

Figure 1:
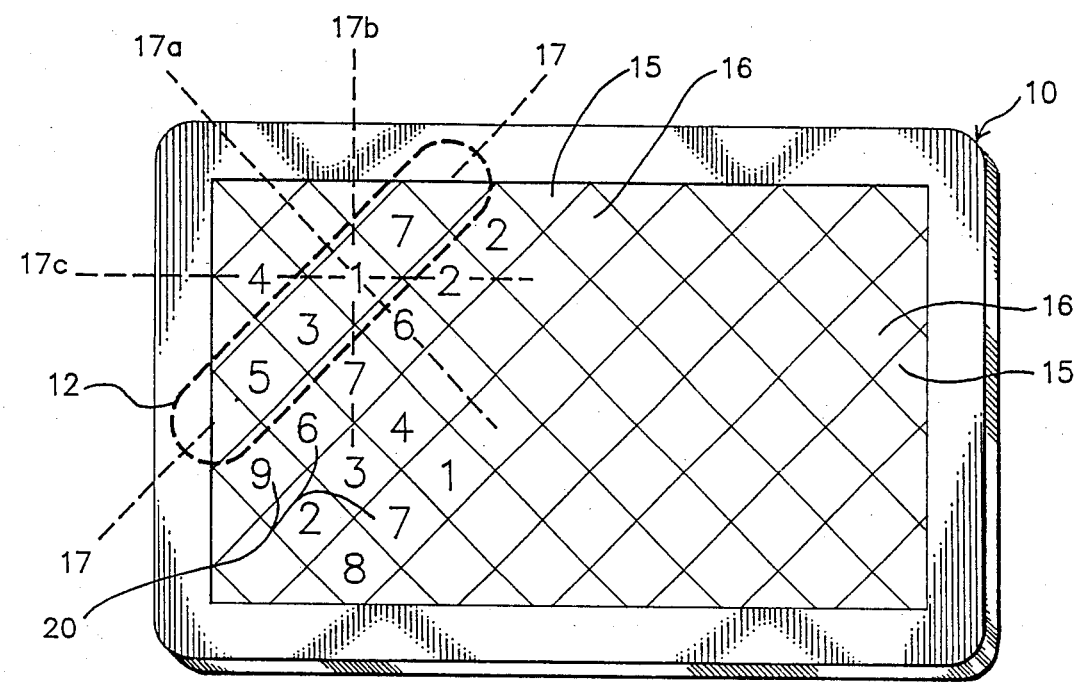
FIG. 1 shows a front perspective view of one embodiment of the present invention having a diagonal arrangement of rows.

FIG. 1 discloses a memory device 10 which comprises a card 11 or other form of carrier having a surface adapted for receiving inscribed information comprising alphanumeric symbols such as numerals and/or letters. The card is preferably made of paper stock so that the surface thereof can be written on by pen or pencil without difficulty. Any material may be suitable, however, subject to the surface thereof being adapted for entry of data by some appropriate means.

The card is configured for insertion in a wallet or a purse to provide reference whenever the occasion demands. If information is included within the card relating to credit card information, such as a bank access code 12, it may be appropriate to provide the card with dimensions corresponding to a credit card. This permits the memory device 10 to be inserted in a wallet pocket with the credit card for quick reference. It will be apparent to those skilled in the art that other sizes of carrier may be suitable, provided they facilitate storage in a wallet or purse.

The operative aspect of the memory device 10 comprises a matrix of contiguous graphic boxes 15 which are positioned on the carrier surface and which have empty spaces 16 for later placement of numerals or letters therein. Such boxes may be square, rectangular, diamond, circular or any graphic configuration which permits insertion and isolation of a numeral, letter or other designated symbol from those around it.

The boxes making up the matrix are positioned such that each box is part of two intersecting rows of boxes, each row being a linear array positioned along a diagonal line 17 within the matrix. Preferably, each box is an intersection of at least four rows of boxes in different diagonal relationships 17, 17a, 17b, 17c. The purpose for such diversity will become apparent with later discussion regarding disguise of confidential numbers within an array of random numbers having no meaning. The orientations of each diagonal row of boxes is immaterial. It will be apparent that the greater number of intersecting diagonals, the greater number of orientations to facilitate such diversity. The important factor is that the operative aspect of the matrix is the linear array of boxes, as opposed to boxes having other relative placement configurations.

As was previously indicated, a series of numbers to be stored 12 are inserted in linear arrangement within one of the aligned diagonal rows of boxes of the matrix. This position may be within the matrix interior or have a starting point along the peripheral boxes which enclose the remaining boxes of the matrix. The positions can be chosen by the user, depending upon the degree of security desired. Those positions within the matrix which are totally surrounded by other boxes will be most difficult to decipher. It will be apparent that many differing confidential numbers may be placed in various orientations and locations within the matrix. This permits a single card to be used for all key number combinations to be stored.

Once the matrix has been properly prepared with all stored numbers in their appropriate locations, the remaining boxes may be filled with random numbers 20. The random numbers are selected so that an individual having no knowledge of the identity of the stored numbers finds it virtually impossible to identify or isolate a confidential, stored number from the other random numbers of a matrix. Accordingly, the stored numbers become disguised in the body of the matrix because the various combinations possible within the matrix become unmanagable for a typical decoding situation.

For example, a dishonest person finding a wallet having the owner's credit card and a memory enhancement card therewith would likely know that a four digit account access code is required in order to withdraw from the credit account. Based on the number of squares filled with numerical choices, the total number of four-numeral combinations exceeds 614,000. It is unlikely that an individual would find it possible to attempt this many combinations is extremely unlikely. This is the case even if the finder of the card understood that he need only check all four numeral linear arrays, he would still have 224 choices to consider.

Figure 2:
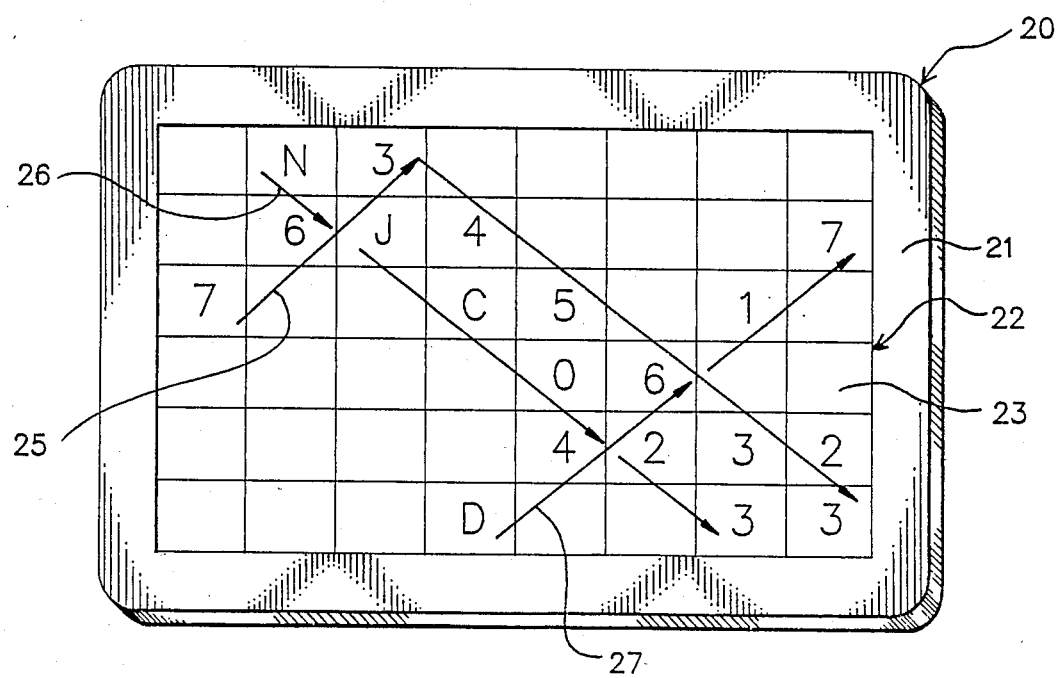
FIG. 2 shows a similar view as that of FIG. 1 of a second embodiment wherein the rows are horizontal and vertical.

FIG. 2 illustrates a second embodiment of the present invention utilizing a combination of numbers and letters within the matrix. A carrier 20 includes an inscription surface 21 and a matrix 22 of boxes having an open space 23. The boxes are similarly arrayed as described above so that each box is a member of several different rows of boxes having varying orientations or diagonals.

This embodiment includes the use of letters along with numbers. Examples of alphanumeric combinations to be stored include a license plate number 26 and an alphanumeric form of back access number 27. This embodiment also illustrates the disposition of long numbers along several diagonals. A social security number 25 may be spread across three diagonals as illustrated by the arrow sections traversing the number 7-6-3-4-5-6-3-3-2. Inasmuch as the user of the card already knows the number, it is a simple matter to follow the line of familiar numbers along virtually any diagonal or direction. Obviously, the use of multiple diagonals makes reconstruction of numbers that much more difficult for one who attempts to breach the security of the card.

It will be apparent to those skilled in the art that many applications of this invention exist. It may be applied to either numbers or letters, or other symbols which an individual may need to recall at any point. It provides a simple effective way to retain combinations to safes, combination locks, door entry combinations for automobiles or the like. Inasmuch as the person using the card does not point to the numbers but merely observes from the matrix those numbers to be used, it may be held in public view without concern for someone else observing the use of the selected number.

Accordingly, it is to be understood that the present invention illustrated by the embodiment shown herein is for illustrative purposes and is not to be deemed to limit the scope of the invention beyond the following claims.

We claim:

1. A method for storing a serial string of confidential numbers and/or letters in public view without compromising the confidentiality thereof while providing a memory device to enable a person having knowledge of the numbers or letters to recognize and recall the same, said method comprising the steps of:

forming a matrix of graphic boxes in vertical and horizontal array having empty spaces within the boxes for later placement of alphanumeric symbols therein, each box having an alignment with other boxes along at least two diagonals within the matrix as part of at least two rows of boxes in linear array;

placing at least one serial string of confidential alphanumeric symbols in a sequential linear array of boxes along at least one of the aligned diagonals of the matrix;

filling in the remaining empty boxes with random numbers to disguise the identity and location of the stored confidential symbols.

2. A method as defined in claim 1 wherein the second step comprises placing at least one serial string of confidential numbers within a sequential linear array of boxes along one of the aligned diagonals of the matrix.

3. A method as defined in claim 2, comprising the additional step of placing a second serial string of confidential numbers along a second sequential linear array of boxes of an aligned diagonal of the matrix.

4. A device for storing a serial string of confidential alpha numeric symbols in public view without compromising the confidentiality thereof, yet enabling a person having knowledge of the numbers to recognize and recall the numbers by reference to the device, said device comprising:

a carrier surface having dimensions that permit its carriage within a wallet pocket;

a matrix of vertically and horizontally contiguous graphic boxes positioned on the carrier surface and having empty spaces within the boxes for later placement of numerals therein, each box having an alignment with other boxes along at least two diagonals within the matrix as part of at least two rows of boxes in linear array;

said matrix including at least one serial string of confidential numbers in a sequential linear array of boxes along one of the aligned diagonals of the matrix;

the remaining boxes within the matrix having random numbers therein to disguise the identity and location of the stored confidential numbers.

5. A device as defined in claim 4 wherein the carrier surface comprises a card member having dimensions approximately equal to a standard credit card and adapted to be carried therewith.

6. A device as defined in claim 4 wherein the matrix of boxes comprises vertically and horizontally aligned rows of rectangular shapes of common dimension.

7. A device as defined in claim 4 wherein the matrix includes at least four vertical rows of boxes and four horizontal rows of boxes each in linear array.

8. A device as defined in claim 4 wherein the matrix of boxes comprise diamond shape structures along vertical and horizontal orientations.

* * * * *